Jan. 13, 1953  W. E. SAXE  2,625,301
AUTOMATIC DISPENSING APPARATUS
Filed Aug. 28, 1947  4 Sheets—Sheet 1 light light

INVENTOR:
WALTER E. SAXE,
BY HIS ATTORNEYS
HARRIS, KIECH, FOSTER & HARRIS
BY Ward D. Foster Jan. 13, 1953  W. E. SAXE  2,625,301
AUTOMATIC DISPENSING APPARATUS
Filed Aug. 28, 1947  4 Sheets-Sheet 2

INVENTOR:
WALTER E. SAXE
BY HIS ATTORNEYS
HARRIS, KIECH, FOSTER & HARRIS,

Jan. 13, 1953  W. E. SAXE  2,625,301
AUTOMATIC DISPENSING APPARATUS
Filed Aug. 28, 1947  4 Sheets-Sheet 3

INVENTOR:
WALTER E. SAXE
BY HIS ATTORNEYS
HARRIS, KIECH, FOSTER & HARRIS,

Jan. 13, 1953   W. E. SAXE   2,625,301
AUTOMATIC DISPENSING APPARATUS
Filed Aug. 28, 1947   4 Sheets-Sheet 4
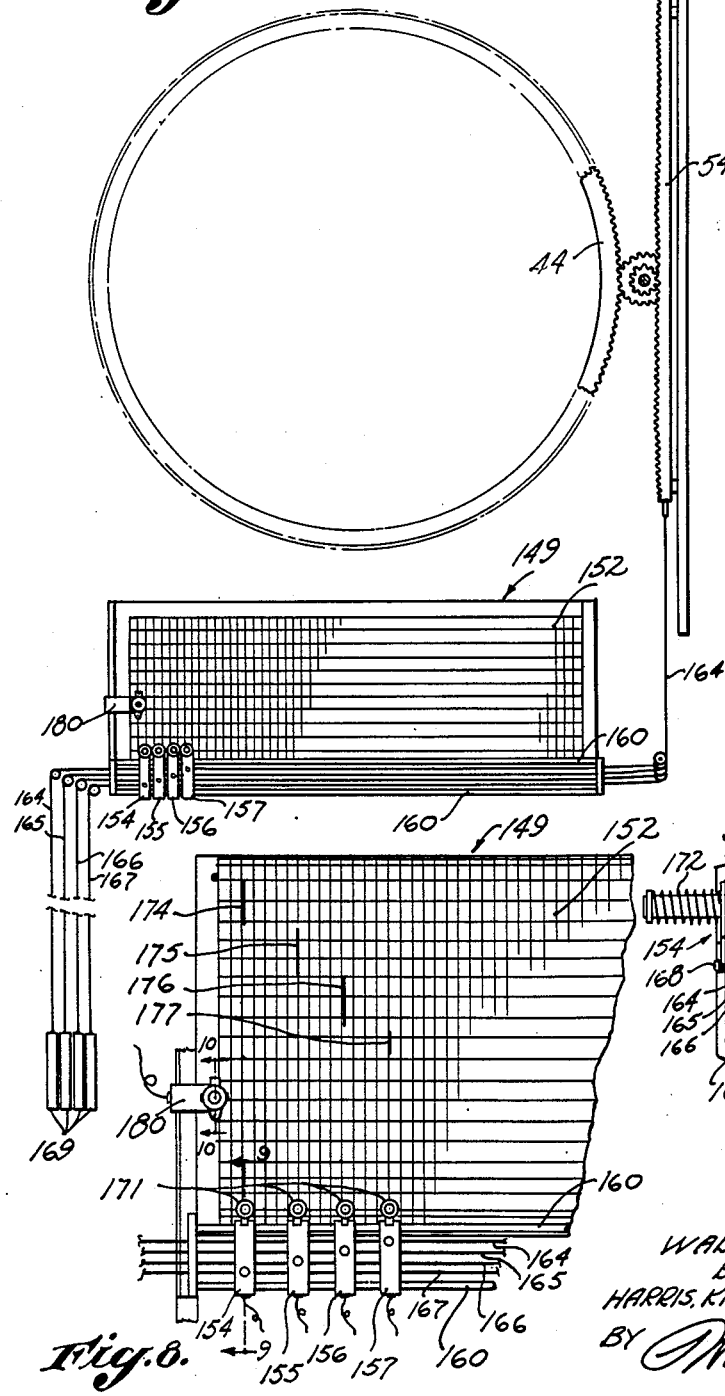
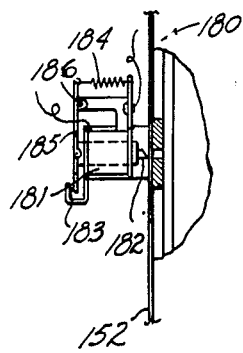
INVENTOR:
WALTER E. SAXE
BY HIS ATTORNEYS
HARRIS, KIECH, FOSTER & HARRIS, Patented Jan. 13, 1953

2,625,301

UNITED STATES PATENT OFFICE 2,625,301

AUTOMATIC DISPENSING APPARATUS

Walter E. Saxe, San Gabriel, Calif., assignor to The Conveyor Company, Los Angeles, Calif., a corporation of California Application August 28, 1947, Serial No. 771,013

22 Claims. (Cl. 222—14)

My invention relates to general to apparatus for dispensing materials in measured quantities and, more particularly, to an apparatus for producing mixtures of predetermined proportions.

In general, it is an object of the invention to provide an apparatus for actuating a plurality of dispensing devices in such a manner that each device dispenses a measured quantity of material from a source with which it is associated. More specifically, it is an object of the invention to provide an apparatus for actuating the dispensing devices under the control of means responsive to the quantities of material dispensed by the devices.

As an example, an apparatus embodying the fundamental principles of my invention may be employed in connection with an installation wherein the sources of material referred to in the preceding paragraph are storage bins and the dispensing devices are gates or other discharge controlling devices. Such installations, an example of which may be found in my Patent No. 2,336,130, issued December 7, 1943, are used extensively for combining the constituents of such materials as concrete, for example, although other uses therefor are well known to those skilled in the art.

Since the invention is particularly applicable to and was orginally embodied in a dispensing apparatus which is responsive to the weights of the materials dispensed thereby, I prefer to consider such an embodiment herein for purposes of illustration. However, the invention may be embodied in apparatus responsive to variables other than the weights of the dispensed materials and it will be understood, therefore, that I do not desire to be limited to the particular embodiment which I have elected to disclose herein. For example, as will be apparent to those skilled in the art, various features of the invention may be incorporated in an apparatus which in responsive to such parameters of the dispensed materials as their volumes, pressures, levels in a container, etc.

Considering the nature of the invention in more detail, it is a primary object to provide an apparatus having a plurality of material dispensing devices and having photoelectrically controlled means responsive to the quantities of material dispensed by the respective devices for actuating and subsequently de-actuating the devices in sequence in such a manner that each device dispenses a predetermined quantity of material from a source with which it is associated. More specifically, an object in this connection is to provide an apparatus having means for actuating the dispensing devices in sequence and having photoelectric means for de-actuating each device whenever a predetermined quantity of material has been dispensed thereby.

An important object of the invention is to provide an apparatus having means whereby the quantities of material to be dispensed by the various dispensing devices may be fixed simultaneously and in a single operation.

More specifically, an object of the invention is to provide an apparatus having an indicator which is movable through distances proportional to the quantities of material dispensed by the dispensing devices and having a plurality of control devices which are shiftable along the path of the indicator and which are adapted to cooperate therewith to control the operation of the dispensing devices in such a manner as to dispense predetermined quantities of the materials. An important object in this connection is to provide means for positioning all of the control devices in a single operation so as to fix the quantities of material to be dispensed by all of the dispensing devices simultaneously.

A further object of the invention is to provide an apparatus wherein the control devices are mounted on members which are movable along parallel paths and which are engageable by template means for simultaneously moving all of the members. A related object is to provide template means comprising a stair-like template having a plurality of steps which are adapted to engage the respective members which carry the control devices.

Another improtant object is to provide means movable transversely of the paths of the members which carry the control devices for bringing any one of a plurality of such templates into an operative position relative to the members so that any one of several possible combinations of the quantities of material to be dispensed by the various dispensing devices may be obtained readily.

An object in connection with the specific embodiment of the invention disclosed herein is to provide an apparatus wherein the control devices are light sources which, in cooperation with the movable indicator, regulate the operation of the photoelectrically controlled means for actuating and de-actuating the dispensing devices.

A further object of the invention is to provide an apparatus of the foregoing character wherein the movable indicator is adapted to convey light from the various light sources to a single, stationary photoelectric cell, the indicator being non-linear and being formed of a material which is capable of conveying light along an irregular path.

Still another object is to provide an automatic dispensing apparatus having means for producing a permanent record of the operation of the dispensing devices.

The foregoing objects of my invention and the advantages suggested thereby, together with various other objects and advantages which will become evident hereinafter, may be attained through the employment of the exemplary embodiment which is illustrated in the accompanying drawings and which is described in detail hereinafter.

Referring to the drawings, which are intended as illustrative only:

Fig. 7 is a semi-diagrammatic view showing a recording means which forms part of the apparatus;

Fig. 8 is an enlarged, fragmentary view showing a portion of the recording means; and Figs. 9 and 10 are further enlarged, fragmentary sectional views which are taken along the broken lines 9—9 and 10—10 of Figure 8.

Figure 1:
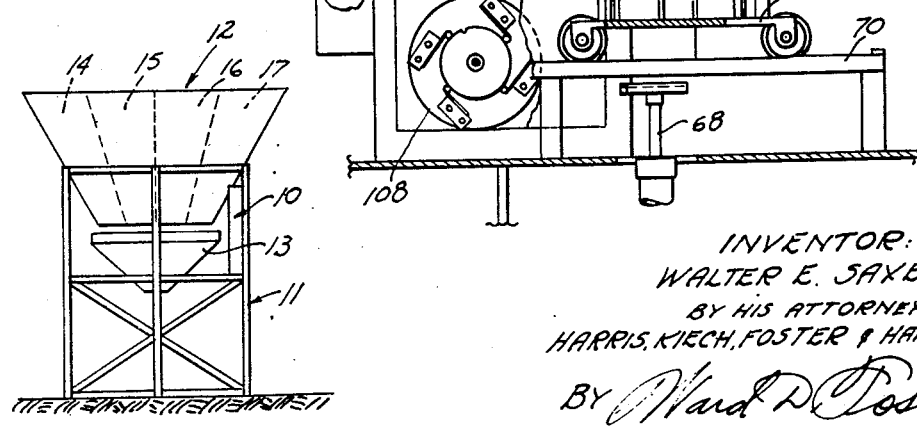
Fig. 1 is a view on a reduced scale showing, in semi-diagrammatic form, an installation in which a dispensing apparatus embodying the fundamental principles of my invention may be incorporated.

Referring particularly to Fig. 1 of the drawings, I show an installation with which my dispensing apparatus, indicated generally by the numeral 10, may be incorporated. This installation includes a frame 11 which carries a hopper 12 and a receiver or receptacle 13, the hopper being divided into four storage compartments or bins 14, 15, 16 and 17 in the particular construction illustrated so that four different materials may be discharged into the receiver. It will be understood, of course, that the number of materials to be handled may be varied as desired, the number four having been selected merely for purposes of illustration.

The installation shown in Fig. 1 of the drawings may, for example, be employed for combining the various constituents of concrete, in which case the bins 14 to 17 may contain cement and various grades of aggregates such as sand, gravel, crushed rock, etc. The materials delivered into the receiver 13 subsequently may be discharged therefrom into a concrete mixer (not shown), the frame 11 supporting the hopper 12 and receiver 13 preferably being so designed that a truck (not shown) carrying a concrete mixer may be driven beneath the receiver so that the mixture contained therein may be discharged into the mixer as is well known in the art.

Figure 2:
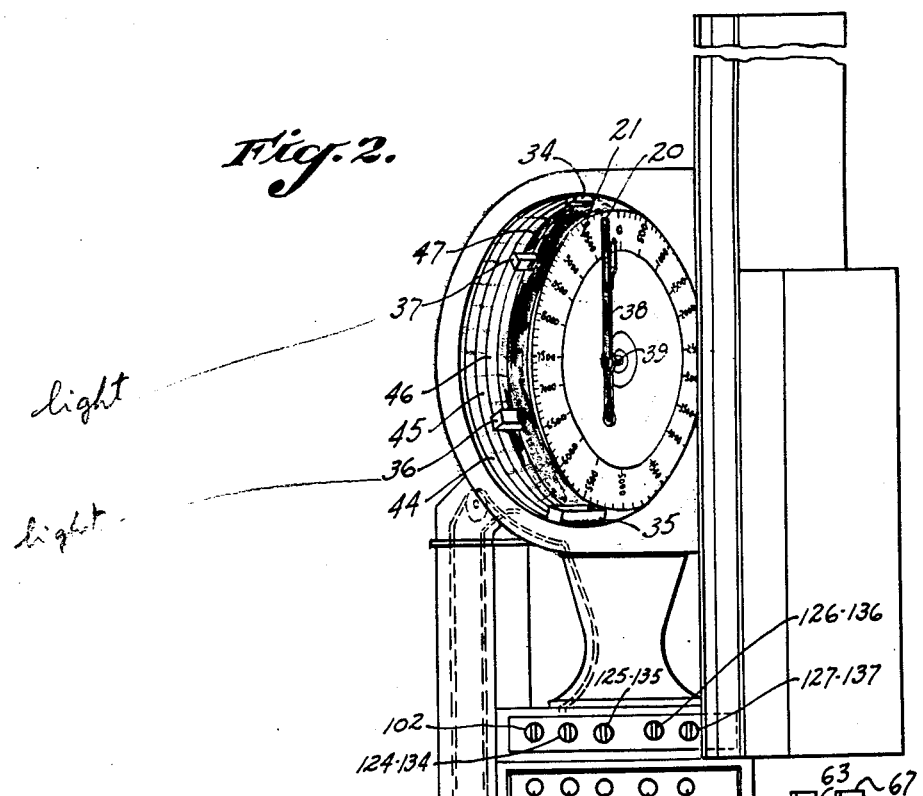
Fig. 2 is an elevational view of the dispensing apparatus.

Referring particularly to Fig. 2 of the drawings, the dispensing apparatus 10, in the particular construction illustrated, includes a scale which is connected to the receiver 13 in a manner not specifically shown but well known in the art so as to produce movement of an indicator 20 over a scale dial 21 in response to variations in the weight of the mixture contained in the receiver. As will be discussed in detail hereinafter, such weight variations are utilized to control the operation of dispensing devices which regulate the delivery of material from the bins 14 to 17 into the receiver 13, such dispensing devices being shown schematically in Fig. 6 and being indicated by the numerals 24, 25, 26 and 27. These dispensing devices, which are exemplified as simple gates, may be of any suitable type and may be of the type disclosed in my aforesaid prior patent if desired.

Figure 4:
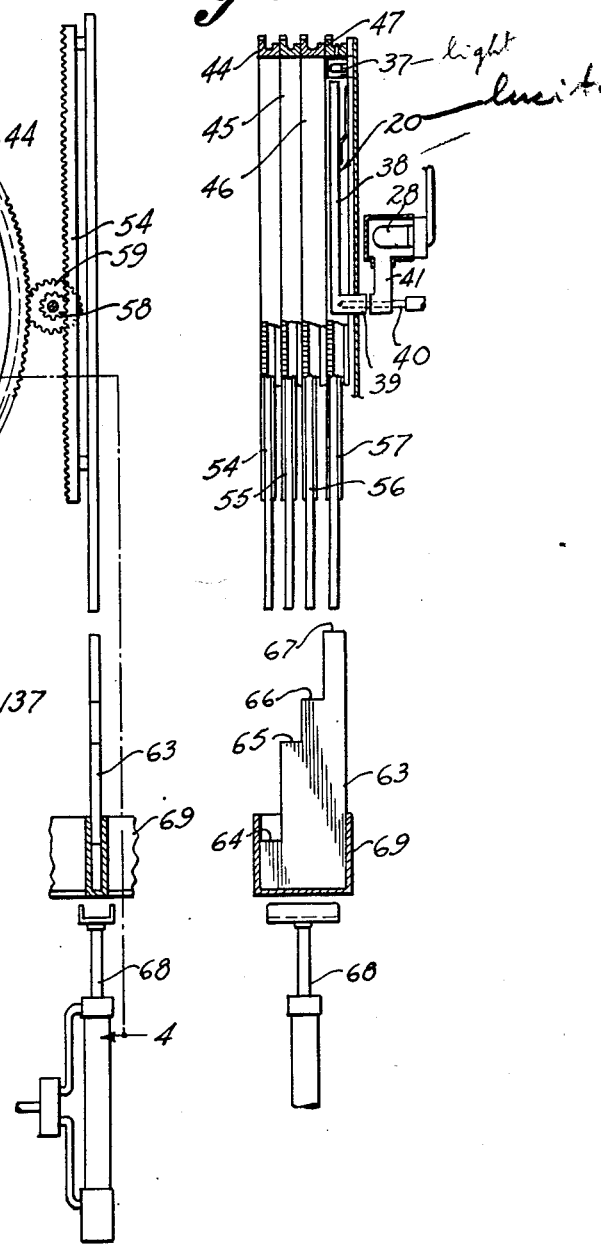
Fig. 4 is a view taken along the irregular broken line 4—4 of Fig. 3 in the direction of the arrows intersecting this line.
Figure 5:
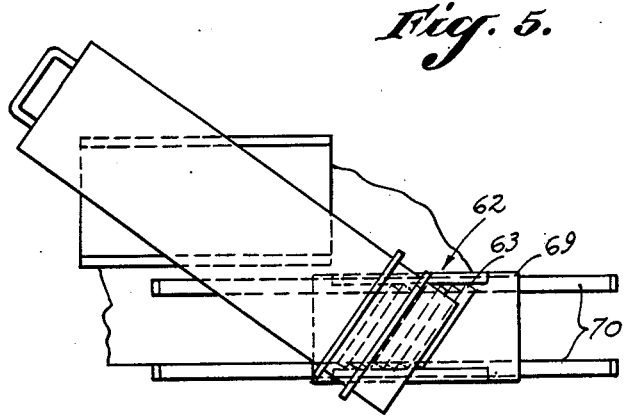
Fig. 5 is a plan view of the dispensing apparatus.

Considering the dispensing apparatus 10 in more detail, the dispensing devices 24 to 27 are actuated in sequence by a photoelectrically controlled means whose operation is regulated by the position of the indicator 20 relative to the scale dial 21 in such a manner that the dispensing devices deliver predetermined quantities of the materials contained in the bins 14 to 17 into the receiver 13 in sequence. As best shown in Figs. 2 and 4, the photoelectrically controlled means includes a photoelectric cell 28 which is mounted behind the scale dial 21 and which is adapted to receive light in sequence from a plurality of light sources as the indicator 20 moves around the dial, the light sources serving as control devices which determine the quantities of material to be dispensed by the dispensing devices 24 to 27. These light sources, which are shown as four in number to correspond to the four dispensing devices 24 to 27, are spaced around the scale dial and identified by the numerals 34, 35, 36 and 37. Each light source preferably includes a pair of light bulbs, for example, so that the apparatus will still operate in the event of failure of one of the bulbs.

As best shown in Fig. 4 of the drawings, the light from the light sources 34 to 37 falls on the outer end of a pointer 38, which forms part of the indicator 20, as the pointer moves past successive ones of the light sources. The indicator 20 is formed of a material which has the characteristic of conveying light along a non-linear path, an example of such a material being methyl methacrylate, commonly known as "Lucite," so that the light falling on the end of the pointer 38 passes through the pointer and through a shank 39 which forms part of the indicator, the indicator being carried by a shaft 40 which is rotatable in response to variations of the weight of the material in the receiver 13 by a suitable weighing mechanism which is not shown but which is well known in the art. The light passing through the indicator 20 traverses a space between the shank 39 thereof and an arm of an L-shaped member 41 which is also formed of a material that is capable of conveying light along an irregular path, the L-shaped member 41 being so positioned that the light passing therethrough falls upon the photoelectric cell 28 which controls the operation of the dispensing devices 24 to 27 in a manner to be described hereinafter. Thus, it will be apparent that as the indicator 20 moves around the scale dial 21, light from successive ones of the light sources 34 to 37 is transmitted to the photoelectric cell 28 by the indicator and by the L-shaped member 41.

The light source 34 is spaced from the zero point on the scale dial 21 a distance proportional to the weight of the material to be discharged from the bin 14 by the dispensing device 24. The light source 35 is spaced from the light source 34 a distance proportional to the weight of the material to be discharged from the bin 15 into the receiver 13 by the dispensing device 25. Similarly, the light sources 36 and 37 are spaced from the light sources 35 and 36, respectively, distances proportional to the weights of the materials to be discharged from the bins 16 and 17, respectively, by the dispensing devices 26 and 27. Thus, as will be discussed in more detail hereinafter, material is discharged from the bin 14 during the interval that the indicator 20 moves from the zero point on the scale dial 21 to the light source 34, material is discharged from bin 15 during the interval that the indicator moves from the light source 34 to the light source 35, etc.

Figure 3:
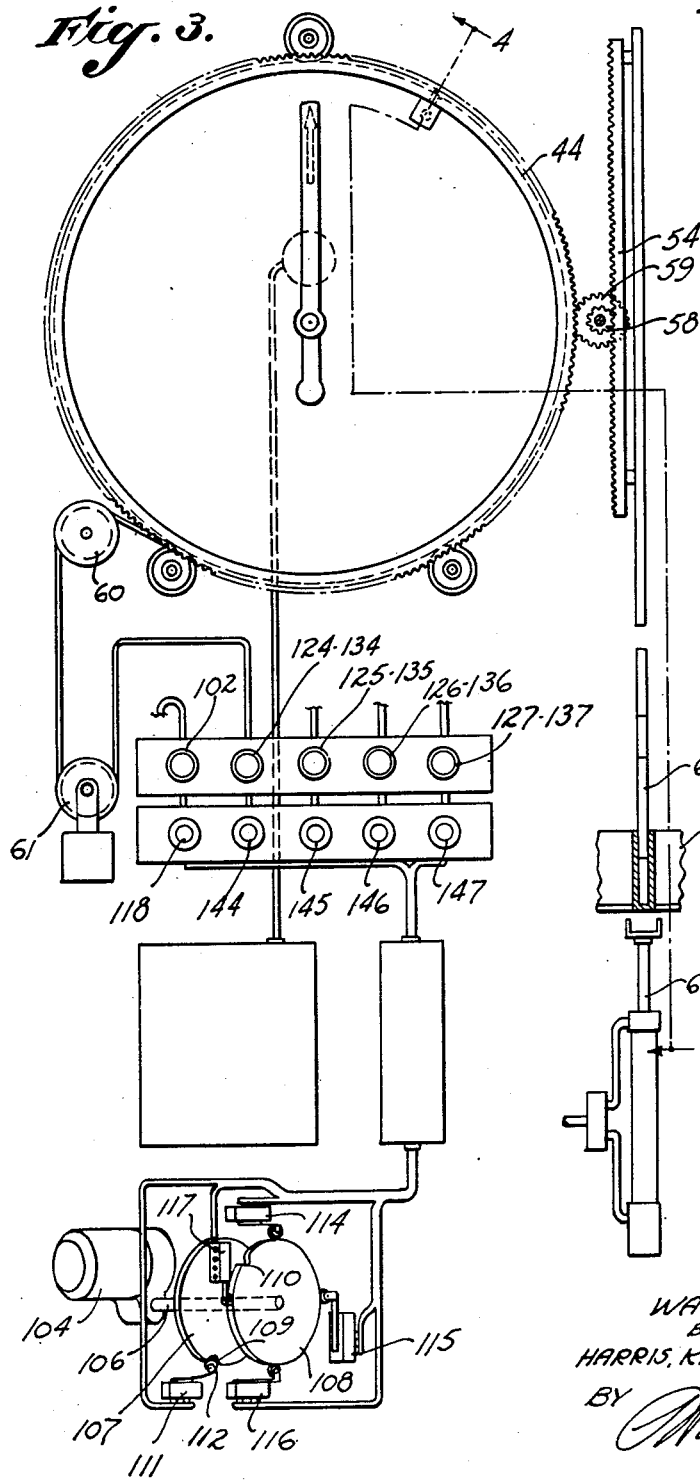
Fig. 3 is a semi-diagrammatic view showing various components of the apparatus.

In order to permit varying the weights of the materials to be delivered from the bins 14 to 17 into the receiver 13 by the respective dispensing devices 24 to 27, the light sources 34 to 37 are shiftable along the path of the end of the pointer 38 in a manner about to be described. As indicated in Fig. 2 and as shown in more detail in Figs. 3 and 4, the light sources 34 to 37 are mounted on ring gears 44 to 47, respectively, which are concentric with the path of the indicator 20 and which are rotatable about the axis of rotation thereof to move the light sources to different points on the scale dial 21. The ring gears 44 to 47 are adapted to be rotated by racks 54 to 57, respectively, as best shown in Figs. 3 and 4, each rack being operatively connected to the corresponding ring gear by gears 58 and 59 which provide a gear ratio such that a relatively small movement of each rack produces a larger movement of the corresponding ring gear. Thus, by moving the racks 54 to 57, the corresponding ring gears 44 to 47 are rotated to shift the corresponding light sources 34 to 37 with respect to the scale dial 21. It will be noted that I have shown in Fig. 3 a system for supplying current to each light source which includes an electrical cable trained over pulleys 60 and 61, the pulley 61 being suspended by the cable and being weighted to compensate for movement of the light source to which each cable is connected. However, it will be understood that other systems of supplying current to the light sources, such as a brush system, for example, may be employed.

Although the racks 54 to 57 controlling the positions of the light sources 34 to 37 may be moved individually, as by means of suitable handles (not shown), an important feature of the invention is to provide means indicated generally by the numeral 62 for positioning all of the light sources 34 to 37 in a single operation by adjusting the position of all of the racks simultaneously. As best shown in Fig. 4, the means 62 preferably includes a template 63 of stair-like form having a plurality of steps 64 to 67 which are adapted to engage the racks 54 to 57, respectively, so that bringing the template into engagement with the racks and moving it in the direction of movement of the racks causes all of the light sources 34 and 37 to be positioned automatically. It will be apparent that the heights of the various steps 64 to 67 of the template 63 determine the positions of the light sources 34 to 37, respectively, relative to the scale dial 21 to determine the weights of the materials to be dispensed by the respective dispensing devices.

The dispensing apparatus includes a plunger 68, which may be a hydraulically operated ram, for moving the template 63 into engagement with the racks 54 to 57 and for subsequently moving the template and the racks so as to move the light sources 34 to 37 into predetermined positions with respect to the scale dial. In order to permit varying the proportions of the mixture formed by discharging materials from the bins 14 to 17 into the receiver 13, I prefer to provide a plurality of templates 63 which are mounted on a cart 69, the cart being movable along rails 70 so as to bring any one of the templates into an operative position with respect to the plunger 68 and the racks 54 to 57. Thus, any one of several mixtures having constituents in different proportions may be delivered to the receiver 13 by moving the cart 69 to bring the proper template 63 into an operative position with respect to the racks 54 to 57 and subsequently actuating the plunger 68 to position all of the light sources 34 to 37 simultaneously as previously described.

For convenience, the disclosure thus far has been restricted to a description of the structure of the dispensing apparatus 10 as a preamble to describing the photoelectrically controlled means for actuating the dispensing devices 24 to 27 so as to discharge measured quantities of the materials in the bins 14 to 17 into the receiver 13 in sequence in the manner indicated previously. The photoelectrically controlled means will now be considered in more detail with particular reference to the schematic diagram in Fig. 6 of the drawings.

Figure 6:
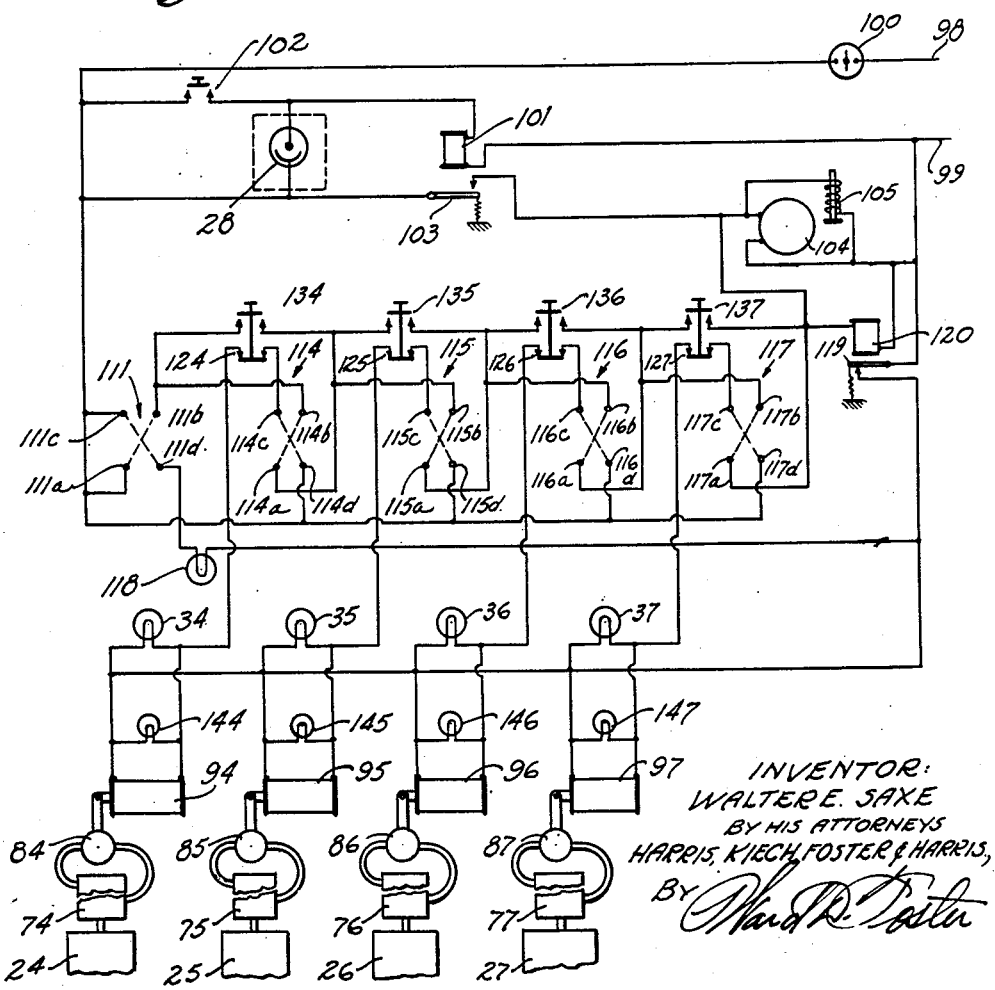
Fig. 6 is a schematic diagram showing an electrical circuit which forms part of the dispensing apparatus.

Referring particularly to Fig. 6, I have shown the dispensing devices 24 to 27 as being actuable by double acting hydraulic units 74 to 77, respectively, which are controlled by suitable selector valves 84 to 87, respectively, the respective valves being in turn controlled by solenoids 94 to 97 which form part of the electrical circuit of the dispensing apparatus. Considering the circuit in more detail, it includes a pair of leads 98 and 99 which are connected to a suitable current source, the lead 98 being connected to an on-off switch 100 which is closed when the apparatus is in operation. The circuit also includes a relay 101 which is controlled by a start switch 102 and by the photoelectric cell 28, which acts as a switch in the circuit, the switch 102 and the photoelectric cell being connected in parallel with each other and being connected in series with the relay. Thus, the relay 101 is energized whenever the start switch 102 is closed, or whenever light from one of the sources 34 to 37 falls on the photoelectric cell 28. For convenience, the amplifier and other apparatus necessarily associated with the photoelectric cell 28 have been omitted from the circuit.

The relay 101, when energized, closes a normally open switch 103 which is connected in series with an electric motor 104, current being supplied to the motor through suitable connections to the leads 98 and 99. A solenoid operated brake 105 is connected across the input leads to the motor 104 and is adapted to prevent coasting of the motor upon opening of the switch 103, the solenoid incorporated in the brake being adapted to disengage the brake when the motor is energized.

Referring to Fig. 3 of the drawings, the motor 104 drives a shaft 106 which carries discs 107 and 108, these discs being provided with notches 109 and 110, respectively. Associated with the disc 107 is a switch 111 which, as shown in Fig. 6, includes contacts 111a, 111b, 111c and 111d, the contacts 111a and 111b normally being connected but the contacts 111c and 111d being connected and the contacts 111a and 111b being disconnected whenever an actuating roller 112 forming part of the switch 111 enters the notch 109 in the disc 107.

Similar switches 114 to 117, which respectively correspond to the dispensing devices 24 to 27, are mounted adjacent the disc 108 and are provided with rollers which are adapted to enter the notch 110 in this disc. As shown in Fig. 6, the switch 114 is provided with contacts 114a to 114d, the contacts 114a and 114b being connected when the roller of the switch 114 is out of the notch 110 in the disc 108 and the contacts 114c and 114d being connected when the roller is in the notch. Similarly, the switch 115 includes contacts 115a to 115d, the switch 116 includes contacts 116a to 116d and the switch 117 includes contacts 117a to 117d, the a and b contacts of the respective switches being connected whenever the rollers thereof are out of the notch 110 in the disc 108, and the c and d contacts being connected when the rollers are in the notch.

The switches 111 and 114 to 117 are connected in series in such a manner that a current path through the motor 104 is established when all of the rollers which actuate these switches are out of the notches in the discs 107 and 108 so that the a and b contacts of all of the switches are connected. Consequently, it will be apparent that the motor 104 will be energized either when the respective a and b contacts of all of the switches 111 and 114 to 117 are connected, or when the switch 103 is closed by the relay 101. As previously discussed, this relay is energized to close the switch 103 whenever the start switch 102 is closed, or whenever light from one of the sources 34 to 37 reaches the photoelectric cell 28.

The switch 111 is also connected in the circuit in such a manner that when the roller associated therewith enters the notch 109 in the disc 107 to establish a connection between the contacts 111c and 111d, this switch is connected in series with a pilot light 118, which is preferably green. Connected in series with the pilot light 118 is a normally closed switch 119 which is opened by a relay 120 whenever the motor 104 is energized, the relay 120 being connected in parallel with the motor. Thus, when the contacts 111a and 111b of the switch 111 are connected, this switch is connected in series with the switches 114 to 117 and the motor 104 (provided that the respective a and b contacts of all of the switches 114 to 117 are connected), and, when the contacts 111c and 111d of the switch 111 are connected, this switch is connected in series with the pilot light 118 and the switch 119.

The switch 114 is connected in the circuit in such a manner that when the roller associated therewith enters the notch 110 in the disc 108 to connect the contacts 114c and 114d of this switch, a current path through the light source 34 is established, the light source 34 being connected to the contact 114c of the switch 114 through a normally closed switch 124. The switches 115, 116 and 117 are connected in the circuit in a similar manner so that the respective c and d contacts thereof are connected, current paths through the light sources 35, 36 and 37, respectively, are established. Normally closed switches 125, 126 and 127 which are similar to the switch 124 are included in the circuit, the switch 125 being interposed between the contact 115c of the switch 115 and the light source 35, the switch 126 being interposed between the contact 116c of the switch 116 and the light source 36, and the switch 127 being interposed between the contact 117c of the switch 117 and the light source 37.

Normally open switches 134 to 137 are mechanically connected to the normally closed switches 124 to 127, respectively, in such a manner that whenever the switches 134 to 137 are closed, the switches 124 to 127 are open, and vice versa. The switches 134 to 137 are connected in the circuit as shown in Fig. 6 and cooperate with the switches 124 to 127 to perform functions which will be discussed in more detail hereinafter.

The solenoids 94 to 97 which, through the respective valves 84 to 87 and hydraulic units 74 to 77, control the dispensing devices 24 to 27 are connected in parallel with the light sources 34 to 37 so that whenever the c and d contacts of any one of the switches 114 to 117 are connected by entry of the roller associated therewith into the notch 110 of the disc 108, the corresponding one of the solenoids 94 to 97 is also energized to actuate the corresponding one of the dispensing devices 24 to 27.

If desired, indicator lights 144 to 147, which are preferably red, may be connected in parallel with the solenoids 94 to 97, respectively, so that each of these lights will be energized whenever the corresponding solenoid is energized to indicate that the corresponding one of the dispensing devices 24 to 27 has been actuated.

For convenience in considering the operation of my dispensing apparatus, the procedure for initiating operation thereof will be related. Knowing the quantities of the various materials which are to be delivered into the receiver 13 from the bins 14 to 17, the operator moves the cart 69 along the rails 70 until the proper template 63 is in an operative position with respect to the racks 54 to 57. The operator then actuates the plunger 68 so that the selected template 63, acting through the racks 54 and 57 and the ring gears 44 to 47, positions the light sources 34 to 37 relative to the scale dial 21 so that the distance between the zero point on the dial and the light source 34 is proportional to the quantity of material to be discharged from the bin 14, the distance between the light source 34 and the light source 35 is proportional to the quantity of material to be discharged from the bin 15, etc.

After the light sources 34 and 37 have been positioned with respect to the scale dial 21, the dispensing apparatus is ready for operation and, in the electrical circuit, the following conditions obtain: the switches 100, 102 and 134 to 137 are open; the switches 124 to 127 are closed; the photoelectric cell 28 and the relay 101 are de-energized so that the switch 103 controlled thereby is open; the relay 120 is de-energized so that the switch 119 is closed; the motor 104 is de-energized; the roller for actuating the switch 111 is in the notch 109 in the disc 107 so that the contacts 111c and 111d of this switch are connected; all of the rollers for actuating the switches 114 to 117 are out of the notch 110 in the disc 108 so that the respective a and b contacts of all these switches are connected; the light sources 34 to 37 are de-energized; the pilot light 118 is de-energized; the indicator lights 144 to 147 are de-energized; and the solenoids 94 to 97 controlling the dispensing devices 24 to 27 are de-energized so that no material can flow from any of the bins 14 to 17 into the receiver 13.

With the foregoing conditions obtaining, the operator closes the on-off switch 100, which establishes a generally counterclockwise current path from the lead 98 to the contact 111c of the switch 111, through this switch to the contact 111d, and thence through the pilot light 118 and switch 119 to the lead 99. Thus, the pilot light 118 is energized to indicate that the electrical system of the apparatus is ready for operation.

The operator then closes the start switch 102 momentarily to energize the relay 101, which closes the switch 103, thus energizing the motor 104 and the relay 120. The latter opens the switch 119 to de-energize the pilot light 118, thus indicating that the apparatus is in operation. As the motor 104 is energized, it rotates the discs 107 and 108 in a clockwise direction, as viewed in Fig. 3, so that the roller controlling the switch 111 leaves the notch 109 in the disc 107 to break the connection between the contacts 111c and 111d of this switch and to establish the connection between the contacts 111a and 111b thereof. At this time, all of the rollers controlling the switches 114 to 117 will be out of the notch 110 in the disc 108 so that a current path to the motor is established through the switches 111 and 114 to 117, this current path, as viewed in Fig. 6, extending in a generally counterclockwise direction from the lead 98 through the switches 111 and 114 to 117 in sequence, through the motor, and thence to the lead 99. This current path may be traced through the switches 111 and 114 to 117 in Fig. 6 by going from the contact 111a of the switch 111 to the contact 117a of the switch 117 by way of the contacts 111b, 114b, 114a, 115b, 115a, 116b, 116a, and 117b in sequence. Since this current path is established through the switches 111 and 114 to 117 as soon as the roller controlling the switch 111 leaves the notch 109 in the disc 107, the start switch 102 may be released without de-energizing the motor 104, although this act will de-energize the relay 101 since no light from one of the light sources 34 to 37 has as yet reached the photo-electric cell 29.

The motor 104 continues to rotate the discs 107 and 108 until the roller which controls the switch 114 enters the notch 110 in the disc 108, whereupon the connection between the contacts 114a and 114b of the switch 114 is broken and the connection between the contacts 114c and 114d thereof is established. Thus, the current path to the motor 104 is broken so that the roller controlling the switch 114 remains in the notch 110 in the disc 108. At the same time, the relay 120 is de-energized so that the switch 119 is closed. Thus, a current path is established through the switch 114, the light source 34, the solenoid 94, and the indicator light 144. Thus, the solenoid 94 is energized and actuates the valve 84 controlling the hydraulic unit 74 so as to actuate the dispensing device 24, thereby permitting material from the bin 14 to flow into the receiver 13.

Such flow continues until a quantity of material sufficient to move the indicator 20 to the light source 34 has been discharged into the receiver 13. When this occurs, light from the source 34 passes through the indicator 20 and the L-shaped member 41 and reaches the photoelectric cell 28, thus causing the photoelectric cell to establish a current path from the lead 93 through the relay 101 to the lead 99. The relay 101, when energized in this manner, closes the switch 103 to energize the motor 104, whereupon the motor rotates the discs 107 and 108 so that the roller controlling the switch 114 leaves the notch 110 in the disc 108 to break the connection between the contacts 114c and 114d and to make the connection between the contacts 114a and 114b. At the instant light from the source 34 falls on the photoelectric cell 28, the relay 101 is energized to establish a current path through the relay 120 so as to open the switch 119, thus breaking the current path through the light source 34, the indicator light 144 and the solenoid 94.

When the solenoid 94 controlling the dispensing device 24 is de-energized in this manner, the dispensing device terminates discharge of material from the bin 14 into the receiver 13. Thus, the foregoing sequence of operations has resulted in the delivery of a predetermined quantity of material from the bin 14 into the receiver 13, this quantity being substantially equal to the reading on the scale dial 21 opposite the light source 34.

It will be noted that since the roller controlling the switch 114 leaves the notch 110 in the disc 108 as soon as the motor 104 is energized by the photoelectric cell 28, the connection between the contacts 114c and 114d of this reversing switch is broken to break the current path through the light source 34 so that the photoelectric cell becomes inoperative to de-energize the relay 101 and break the current path to the motor through the switch 103. However, since the connection between the contacts 114a and 114b of the switch 114 has now been re-established, the current path through the switches 111 and 114 to 117 is re-established so that the motor 104 continues to rotate the discs 107 and 108.

Such rotation of the discs 107 and 108 by the motor 104 continues until the roller controlling the switch 115 enters the notch 110 in the disc 108 to break the connection between the contacts 115a and 115b of the switch 115, thus breaking the current path through the motor. At the same time, the connection between the contacts 115c and 115d of the switch 115 is made so that the light source 35, the indicator light 145 and the solenoid 95 controlling the dispensing device 25 are all energized. As a result, material from the bin 15 is permitted to flow into the receiver 13, thus causing the indicator 20 to continue its progress around the scale dial 21. Such movement of the indicator 20 continues until it encounters the light source 35, whereupon the solenoid 95 controlling the dispensing device 25 is de-energized by opening of the switch 119 as the relay 120 and the motor 104 are energized through the action of the photoelectric cell 28 in energizing the relay 101 to close the switch 103. Thus, a predetermined quantity of the material in the bin 15 will have been discharged into the receiver 13.

The foregoing operational sequences are repeated until predetermined quantities of the materials in the bins 16 and 17 have also been discharged into the receiver 13, and, after all of the materials have been discharged into the receiver 13 in measured quantities, the motor 104 continues to rotate the discs 107 and 108 until the roller controlling the switch 111 enters the notch 109 in the disc 107 to break the connection between the contacts 111a and 111b of this switch, thus breaking the current path through the motor. The conditions now obtaining are identical to those which obtained when the on-off switch 100 was closed to ready the apparatus for operation. In other words, the apparatus is now in a condition for a repetition of the preceding operating cycle.

The discussion thus far has been based on the assumption that predetermined quantities of the materials in all of the bins 14 to 17 are to be discharged into the receiver 13. However, it is frequently desirable to prevent discharge of one of the materials when a mixture having a smaller number of constituents is desired, this being the function of the previously mentioned switches 124 to 127 and 134 to 137.

For convenience in considering the operation of these switches, it will be assumed that the materials from the bins 15, 16 and 17 are to be discharged into the receiver 13 and that the material from the pin 14 is not to be discharged thereinto. In this case, the operator, preferably prior to closing the start switch 102, opens the switch 124 and closes the switch 134. Since the switches 124 and 134 are mechanically interconnected, this is accomplished in a single operation. Opening the switch 124 prevents the establishment of a current path through the solenoid 94 controlling the dispensing device 24 associated with the bin 14 so that no material will be discharged from this bin when the roller controlling the switch 114 enters the notch 110 in the disc 108. The switch 134, being closed, establishes a by-pass current path around the switch 114 so that the motor 104 is not de-energized when the roller controlling the switch 114 enters the notch 110, the current path through the motor under such conditions being through the switch 111, the switch 134, and the switches 115, 116 and 117. Discharge of material from any one of the remaining bins, i. e., 15, 16 and 17, may be prevented by the paired switches 125—135, 126—136 and 127—137 in a similar manner. It will be noted that if material from only one of the bins 14 to 17 is desired, it is merely necessary to actuate all of the combinations 124—134, 125—135, 126—136 and 127—137 except the one corresponding to the bin from which the material is desired.

It will be understood that an appropriate template 63 differing from the templates described heretofore may be employed if one of the materials is to be omitted. For example, if material from the bin 15 is to be omitted without varying the quantities of the materials to be dispensed from the remaining bins, a template must be employed wherein the distance between the steps 64 and 65 is equal to the distance between the steps 65 and 66 of the template normally used when materials are to be discharged from all of the bins.

As indicated previously, a feature of the invention is to provide means for recording the operation of the dispensing apparatus and, more particularly, the operation of the dispensing devices 24 to 27. Referring particularly to Figs. 7 and 8 of the drawings, the recording means, indicated generally by the numeral 149, includes rollers 150 and 151 over which a strip a quadrille paper 152 is trained, the roller 150 being driven continuously in the direction of the arrow 153 at a speed such that the paper moves continuously at a constant speed. Any suitable means (not shown), such as an electric motor, for example, may be employed to drive the roller 150. Thus, the ordinate of any point on the paper is proportional to time and the Y axis may be divided into suitable units of time as indicated in Fig. 8. Since, in the particular construction illustrated, the apparatus is responsive to the weights of the dispensed materials, the X axis is preferably marked off in units of weight, also as indicated in Fig. 8.

The recording means 149 includes a plurality of recording devices 154 to 157 which correspond to the dispensing devices 24 to 27, respectively, and which are movable across the paper 152 in directions parallel to the X axis. As best shown in Figs. 8 and 9, the recording devices 154 to 157 are slidable along rods 160 which extend across the paper, and are secured to cables 164 to 167, respectively, these cables being connected to the racks 54 to 57, respectively. As best shown in Fig. 9, the recording devices are provided with openings through which the cables 164 to 167 extend, each recording device being secured to the proper cable by a set screw 168.

Referring particularly to Fig. 7, it will be apparent that as the racks 54 to 57 are moved upwardly by the plunger 68 acting through one of the templates 63, the recording devices 154 to 157 will be moved to the right by the corresponding cables. The amounts which the recording devices 154 to 157 are moved by the racks 54 to 57 are so related to the amounts which the light sources 34 to 37 are moved thereby that the positions of the recording devices relative to the weight scale on the paper 152 will correspond to the positions of the light sources relative to the weight scale on the dial 21. In other words, if the rack 54, for example, is moved to position the light source 34 opposite the 500 pound mark, for example, on the dial 21, the recording device is automatically positioned opposite the 500 pound mark on the paper 152. As shown in Fig. 7, the cables 164 to 167 are provided with weights 169 which move the recording devices 154 to 157 to the left whenever the corresponding racks are lowered.

Referring particularly to Fig. 9, each of the recording devices 154 to 157 includes a pen 170 which is controlled by a solenoid 171 and a spring 172. The spring normally holds the pen 170 off the paper 152 and the solenoid, when energized, brings the point of the pen into engagement with the paper, the solenoids of the recording devices 154 to 157 being connected in parallel with the solenoids 94 to 97 controlling the dispensing devices 24 to 27, respectively. Thus, whenever one of the solenoids 94 to 97 is energized in the manner previously described to actuate the corresponding one of the dispensing devices 24 to 27, the pen 170 of the corresponding recording device is brought into engagement with the paper 152.

It will be apparent that the pens of the recording devices 154 to 157 will remain in contact with the paper 152 as long as the solenoids 94 to 97, respectively, are energized to actuate the corresponding dispensing devices 24 to 27. Thus, the recording devices 154 to 157 will produce lines on the paper 150 which are indicated by the numerals 174 to 177, respectively, the length of each of these lines being indicative of the length of time that the corresponding dispensing device is in operation. The abscissa of each of the lines 174 to 177 indicates the setting of the corresponding one of the light sources 34 to 37 relative to the scale dial 21.

The recording means 149 also includes a device 180 for marking the paper 152 at the beginning of each operating cycle. As best shown in Figure 10, the marking device 180 includes a solenoid 181 which is provided with an armature carrying a punch 182, the solenoid being connected in series with the start switch 102 so that it is energized when the start switch is closed at the beginning of each cycle. Thus, a hole is punched in the paper 152 to indicate the beginning of each operating cycle.

Since the operator may, at times, close the start switch 102 for several seconds, it is essential that the punch 182 be retracted as soon as it has marked the paper 152 in order to avoid tearing the continuously moving paper. For this purpose, a switch 183 is connected in series with the solenoid 181, the switch being connected to the armature in such a manner that when the armature moves to cause the punch 182 to mark the paper 152 the solenoid circuit is automatically broken. The marking device 180 includes a spring 184 for retracting the armature after a hole has been punched in the paper 152, the spring being connected to the armature through a lever 185 which is pivoted at 186.

Considering the operation of the recording means 149, when the operator closes the start switch 102 to start the dispensing apparatus, the marking device 180 punches a hole in the paper 152 to mark the beginning of the operating cycle, the circuit to the solenoid 181 being broken by the switch 183 as soon as the armature of the solenoid has moved a predetermined distance so as to prevent tearing of the paper. It will be understood that the punch 182 is located close to the surface of the paper so that only a slight movement of the armature is necessary to produce the desired hole.

Subsequently, as successive ones of the solenoids 94 to 97 are energized to actuate the corresponding dispensing devices 24 to 27, the solenoids 171 of the corresponding recording devices 154 to 157 are energized to cause the pens 170 of the respective recording devices to produce lines, such as the lines 174 to 177, on the paper 152, thereby providing a record of the length of time that material is being dispensed by each dispensing device and providing a record of the weights for which the apparatus is set.

In addition to serving as a check on the operation of the dispensing apparatus, the record obtained in this manner may be employed for various other purposes, such as in determining the productivity of an installation in which the apparatus is incorporated. For example, if analysis of the record at the end of a given length of time shows a number of relatively long blank spaces, indicating that the installation was idle, operating schedules may be modified so as to utilize the installation more efficiently.

It will thus be apparent that I have provided an apparatus by means of which one or more materials may be dispensed in measured quantities. Although I have disclosed an exemplary embodiment of my invention herein for purposes of illustration, it will be understood that I do not desire to be limited specifically to such an embodiment since various changes, modifications and substitutions may be incorporated therein without necessarily departing from the spirit of the invention. Accordingly, I hereby reserve the right to all such changes, modifications and substitutions as properly come within the scope of my invention as set forth in the appended claims.

I claim as my invention:

1. In an apparatus for controlling a plurality of material dispensing devices, the combination of: a plurality of electrical circuits respectively corresponding to the dispensing devices; a device in each of said circuits for actuating the dispensing device corresponding thereto; a normally open switch in each of said circuits; means for mechanically closing and subsequently opening said switches in sequential order; means for rendering said switch opening and closing means inoperative upon closure of each of said switches; and means for rendering said switch closing means operative after predetermined quantities of material have been dispensed by the dispensing devices with which the respective switches are associated.

2. In an apparatus of the character described, the combination of: a plurality of sources of material; a plurality of dispensing means for dispensing material from said material sources, respectively; a receiver for the material dispensed by said dispensing means; a plurality of electrical circuits respectively corresponding to said dispensing means; a device in each of said circuits for actuating the dispensing means corresponding thereto; a normally open switch in each of said circuits; means for mechanically closing and subsequently opening said switches in sequence so as to energize and subsequently de-energize said actuating devices in sequence, whereby said dispensing means dispense quantities of material from said material sources in sequence; means for rendering said switch closing means inoperative upon closure of each of said switches; and photoelectrically controlled means for rendering said switch closing means operative whenever a predetermined quantity of material has been delivered into said receiver by one of said dispensing means.

3. In an apparatus of the character described, the combination of: a plurality of sources of material; a plurality of dispensing means for dispensing material from said material sources, respectively; a receiver for the material dispensed by said dispensing means; a number of electrical circuits equal to the number of dispensing means; a device in each of said circuits for actuating one of the dispensing means; a normally open switch in each of said circuits; means for closing and subsequently opening said switches in sequence so as to energize and subsequently de-energize said actuating devices in sequence, whereby said dispensing means dispense quantities of material from said material sources in sequence; means for rendering said switch closing means inoperative upon closure of each of said switches; a photoelectric cell; a number of light sources equal to the number of dispensing means, said light sources being spaced along a predetermined path; means movable along said path for causing light from said light sources to fall upon said photoelectric cell in sequence; means responsive to the quantity of material in said receiver for moving said last-named means along said path at rates proportional to the rates at which material is dispensed by the respective dispensing means; and means controlled by said photoelectric cell for rendering said switch closing means operative whenever light from one of said light sources falls upon said cell so that the dispensing means associated therewith delivers a predetermined quantity of material into said receiver.

4. An apparatus as set forth in claim 3 wherein said light sources are shiftable along said path to vary the quantities of material delivered into said receiver by the corresponding dispensing means, said apparatus including in addition means for simultaneously fixing the positions of all of said light sources on said path.

5. In an apparatus for controlling a plurality of material dispensing devices, the combination of: means for actuating and subsequently de-actuating the dispensing devices in sequence, said actuating and de-actuating means including a plurality of energy-producing control devices which respectively correspond to the dispensing devices and which are adjustably positioned along a predetermined path, including means energizable by the energy produced by said control devices, and including an indicator which is movable along said path through distances proportional to the quantities of material dispensed by the dispensing devices and which is adapted to register with successive ones of said control devices, said indicator having means for conveying the energy produced by said control devices to said energizable means; and means for simultaneously adjusting the positions of all of said control devices on said path.

6. In an apparatus of the character described, the combination of: a plurality of material dispensing devices; a plurality of light sources respectively corresponding to said dispensing devices, said light sources being shiftable along a predetermined path; means governed by said light sources for actuating and subsequently de-actuating said dispensing devices in sequence, said actuating and de-actuating means including photoelectric means and including an indicator which is movable along said path at rates corresponding to the rates at which material is dispensed by the respective dispensing devices and which is adapted to register with successive ones of said light sources, said indicator having means for conveying light from successive ones of said light sources to said photoelectric means; and means for shifting said light sources into predetermined positions.

7. An apparatus as set forth in claim 6 wherein said path is circular and wherein each of said light sources is mounted on a member which is rotatable about the axis of said path.

8. In an apparatus of the character described, the combination of: a plurality of members rotatable about a common axis; a plurality of reciprocable members corresponding to said rotatable members, respectively; means providing driving connections from said reciprocable members to the corresponding rotatable members; and means, including template means engageable with all of said reciprocable members and an actuator for moving said template means, for moving said rotatable members into predetermined positions.

9. In an apparatus of the character described, the combination of: a plurality of members movable along parallel paths; a stair-like template having a plurality of surfaces which are adapted to engage said members, respectively; and means for moving said template into engagement with said members in a direction parallel to said paths.

10. In an apparatus for adjusting the positions of a plurality of members which are movable along parallel paths, the combination of: a stairlike template having a plurality of steps which are adapted to engage the respective members; and means for moving said template into engagement with said members in a direction parallel to said paths.

11. In an apparatus for controlling a plurality of material dispensing devices, the combination of: an indicator comprising a shank having a pointer extending transversely therefrom, said indicator being rotatable about the axis of said shank and being formed of a material which is capable of conveying light along a non-linear path; means responsive to the amount of material dispensed by the dispensing devices for rotating said indicator about said axis, a plurality of light sources spaced along the path of the end of said pointer and arranged to direct light thereon; a photoelectric cell disposed in the path of light passing through said pointer and said shank; and means controlled by said photoelectric cell for actuating and subsequently de-actuating the dispensing devices in sequential order.

12. In an apparatus of the character described, the combination of: a plurality of material dispensing devices; means for actuating and subsequently de-actuating said dispensing devices in sequence, said means including a plurality of shiftable control devices which correspond to said dispensing devices, respectively; a plurality of shiftable recording devices corresponding to said dispensing devices, respectively; and means for shifting said control devices and said corresponding recording devices into predetermined positions in unison.

13. In an apparatus of the character described, the combination of: a plurality of operating circuits; a controlling circuit including switching means for closing and opening said operating circuits in sequence and including photoelectric means for actuating said switching means; movable means for conveying light to said photoelectric means; and a plurality of light sources spaced apart along the path of said movable means.

14. In an apparatus of the character described, the combination of: a plurality of operating circuits; a controlling circuit including switching means for closing and opening said operating circuits in sequence and including photoelectric means for actuating said switching means; means movable along a path having a number of segments equal to the number of said operating circuits for conveying light to said photoelectric means; and a light source at the terminus of each of said path segments.

15. An apparatus according to claim 14 including means for varying the spacing of said light sources along said path.

16. In an appparatus of the character described, the combination of: a plurality of members relatively rotatable about a common axis; a light source carried by each of said members, said light sources being shiftable along a circular path by rotating said members; photoelectric means; and means registering with said photoelectric means and movable along said path for conveying light from said light sources to said photoelectric means.

17. An apparatus as defined in claim 16 wherein said light-conveying means includes an arm which is rotatable about the axis of rotation of said members and which includes a material having the characteristic of conducting light along an irregular path, said arm registering at one end with said photoelectric means and being adapted to register at its other end with said light sources.

18. In an apparatus of the character described, the combination of: a plurality of control members relatively rotatable about a common axis along spaced circular paths; a plurality of control devices carried by said control members, respectively, the relative positions of said control devices varying upon relative rotation of said control members; a plurality of operating circuits; and means controlled by said control devices for closing and opening said operating circuits in sequence, including an element rotatable about said common axis of said control members and registering with said control devices in sequence.

19. An apparatus as defined in claim 18 wherein said control devices are light sources, wherein said means for closing and opening said operating circuits includes switching means and photoelectric means for actuating said switching means, and wherein said rotatable element includes means for conveying light to said photoelectric means from said light sources in sequence.

20. An apparatus as defined in claim 13 including means for varying the spacing of said light sources along said path.

21. An apparatus as defined in claim 16 including means for rotating all of said members into predetermined positions simultaneously.

22. An apparatus as defined in claim 21 wherein the means set forth in claim 21 includes a plurality of racks respectively geared to said members, and includes an element engageable with all of said racks simultaneously.

WALTER E. SAXE.

REFERENCES CITED

The following references are of record in the file of this patent:

UNITED STATES PATENTS

| Number | Name | Date |
| --- | --- | --- |
| 495,590 | Kaucher | Apr. 18, 1893 |
| 1,436,207 | Spencer | Nov. 21, 1922 |
| 1,886,188 | Hough | Nov. 1, 1932 |
| 2,038,746 | Madsen | Apr. 28, 1936 |
| 2,057,495 | Long | Oct. 13, 1936 |
| 2,091,768 | Noble | Aug. 31, 1937 |
| 2,169,465 | Hadley | Aug. 15, 1939 |
| 2,199,010 | Robb | Apr. 30, 1940 |
| 2,256,595 | Metcalf | Sept. 23, 1941 |
| 2,290,278 | Failla | July 21, 1942 |
| 2,398,887 | Drinnon | Apr. 23, 1946 |
| 2,479,031 | Tait | Aug. 16, 1949 |